United States Patent
Poss et al.

(10) Patent No.: US 12,551,871 B2
(45) Date of Patent: Feb. 17, 2026

(54) METAL-FOAM BODY AND METHOD FOR THE PRODUCTION THEREOF AND THE USE THEREOF AS A CATALYST

(71) Applicant: EVONIK OPERATIONS GMBH, Essen (DE)

(72) Inventors: René Poss, Karlsruhe (DE); Monika Berweiler, Maintal (DE); Meike Roos, Büdingen (DE)

(73) Assignee: Evonik Operations GmbH, Essen (DE)

( * ) Notice: Subject to any disclaimer, the term of this patent is extended or adjusted under 35 U.S.C. 154(b) by 810 days.

(21) Appl. No.: 17/762,848

(22) PCT Filed: Sep. 25, 2020

(86) PCT No.: PCT/EP2020/076824
§ 371 (c)(1),
(2) Date: Sep. 27, 2022

(87) PCT Pub. No.: WO2021/058704
PCT Pub. Date: Apr. 1, 2021

(65) Prior Publication Data
US 2023/0001388 A1  Jan. 5, 2023
US 2023/0338932 A2  Oct. 26, 2023

(30) Foreign Application Priority Data

Sep. 25, 2019 (EP) ..................... 19199659

(51) Int. Cl.
| | |
|---|---|
| B01J 23/755 | (2006.01) |
| B01J 21/02 | (2006.01) |
| B01J 35/32 | (2024.01) |
| B01J 35/61 | (2024.01) |
| B01J 37/00 | (2006.01) |
| B01J 37/06 | (2006.01) |

(52) U.S. Cl.
CPC ............ *B01J 23/755* (2013.01); *B01J 21/02* (2013.01); *B01J 35/32* (2024.01); *B01J 35/618* (2024.01); *B01J 37/0018* (2013.01); *B01J 37/06* (2013.01); *B01J 2235/30* (2024.01)

(58) Field of Classification Search
CPC . B01J 23/755; B01J 23/72; B01J 23/75; B01J 21/02; B01J 35/618; B01J 35/60; B01J 35/61; B01J 37/0018; B01J 37/06; B01J 25/00; B01J 25/02
See application file for complete search history.

(56) References Cited

U.S. PATENT DOCUMENTS

| | | |
|---|---|---|
| 4,049,580 A | 9/1977 | Oden et al. |
| 4,491,564 A | 1/1985 | Gray |
| 5,045,277 A | 9/1991 | Penkunas et al. |
| 5,851,599 A | 12/1998 | Harada et al. |
| 6,436,166 B2 | 8/2002 | Arvidsson et al. |
| 6,530,514 B2 | 3/2003 | Shabtay |
| 7,700,518 B2 | 4/2010 | Wang et al. |
| 8,758,675 B2 | 6/2014 | Böhm et al. |
| 10,596,556 B2 | 3/2020 | Radivojevic et al. |
| 10,675,682 B2 | 6/2020 | Nakamura et al. |
| 10,814,390 B2 | 10/2020 | Skszek et al. |
| 11,090,637 B2 | 8/2021 | Wieland et al. |
| 11,173,479 B2 | 11/2021 | Schroeter et al. |
| 11,260,375 B2 | 3/2022 | Berweiler et al. |
| 11,401,224 B2 | 8/2022 | Roos et al. |
| 11,819,832 B2 | 11/2023 | Roos et al. |
| 12,076,790 B2 | 9/2024 | Poss et al. |
| 2005/0275143 A1 | 12/2005 | Toth |
| 2008/0031767 A1 | 2/2008 | Naumann et al. |
| 2008/0171218 A1 | 7/2008 | Naumann et al. |
| 2011/0281723 A1 | 11/2011 | Tsai et al. |

(Continued)

FOREIGN PATENT DOCUMENTS

| | | |
|---|---|---|
| CN | 1798717 | 7/2006 |
| CN | 101254466 | 9/2008 |

(Continued)

OTHER PUBLICATIONS

CN 101549297 A machine translation.*
Non Final Office Action for copending U.S. Appl. No. 17/053,340, mailed Jul. 13, 2022.
U.S. Appl. No. 18/439,722, filed Feb. 12, 2024, Poss.
Amendment & Response for copending U.S. Appl. No. 17/053,340, filed Aug. 8, 2023.

(Continued)

*Primary Examiner* — Michael Forrest
*Assistant Examiner* — Nicole Lee Quist
(74) *Attorney, Agent, or Firm* — Law Office of: Michael A. Sanzo, LLC

(57) ABSTRACT

The invention relates to a method for producing a metal-foam body, comprising the steps of (a) providing a metal-foam body A, which consists of nickel, cobalt, copper, or alloys or combinations thereof, (b) applying an aluminum-containing material MP to metal-foam body A so as to obtain metal-foam body AX, (c) thermally treating of metal-foam body AX, with the exclusion of oxygen, to achieve the formation of an alloy between the metallic components of metal-foam body A and the aluminum-containing material MP so as to obtain metal-foam body B, wherein the duration of the thermal treatment is chosen in dependence on the temperature of the thermal treatment and the temperature of the thermal treatment is chosen in dependence on the thickness of the metal-foam body AX. The invention also relates to the metal-foam bodies obtainable by the methods according to the invention and to the use thereof as catalysts for chemical transformations.

20 Claims, No Drawings

(56) References Cited

U.S. PATENT DOCUMENTS

| | | |
|---|---|---|
| 2012/0141670 A1 | 6/2012 | Walther et al. |
| 2012/0329889 A1 | 12/2012 | Yang et al. |
| 2014/0221700 A1 | 8/2014 | Radivojevic et al. |
| 2017/0141074 A1 | 5/2017 | Schäfer et al. |
| 2017/0167041 A1 | 6/2017 | Poss et al. |
| 2018/0010257 A1 | 1/2018 | Braun et al. |
| 2018/0230081 A1 | 8/2018 | Rüfer et al. |
| 2019/0210010 A1 | 7/2019 | Pinkos et al. |
| 2019/0232257 A1 | 8/2019 | Wieland et al. |
| 2019/0344248 A1 | 11/2019 | Pinkos et al. |
| 2020/0016579 A1 | 1/2020 | Schreiber et al. |
| 2020/0269227 A1* | 8/2020 | Schroeter ............... C23C 30/00 |
| 2021/0010146 A1 | 1/2021 | Poss et al. |
| 2021/0032185 A1 | 2/2021 | Roos et al. |
| 2021/0275996 A1 | 9/2021 | Roos et al. |
| 2021/0276091 A1 | 9/2021 | Poss et al. |
| 2022/0362757 A1 | 11/2022 | Poss et al. |
| 2022/0387986 A1 | 12/2022 | Poss et al. |
| 2022/0395816 A1 | 12/2022 | Poss et al. |
| 2024/0149261 A1 | 5/2024 | Roos et al. |
| 2024/0181527 A1 | 6/2024 | Poss et al. |

FOREIGN PATENT DOCUMENTS

| | | | |
|---|---|---|---|
| CN | 101391222 | 3/2009 | |
| CN | 101537360 | 9/2009 | |
| CN | 101537361 | 9/2009 | |
| CN | 101549297 | 10/2009 | |
| CN | 101549297 A * | 10/2009 | |
| CN | 101921924 | 12/2010 | |
| CN | 102121090 | 7/2011 | |
| CN | 106801159 | 6/2017 | |
| CN | 109175382 | 1/2019 | |
| DE | 102009015176 | 7/2011 | |
| EP | 2 764 916 | 8/2014 | |
| JP | 2002241102 | 8/2002 | |
| JP | 2005205265 | 8/2005 | |
| JP | 2006-049595 | 2/2006 | |
| KR | 101857435 | 5/2018 | |
| WO | WO 95/11752 | 5/1995 | |
| WO | WO 2015/028738 | 3/2015 | |
| WO | WO-2019057533 A1 * | 3/2019 | ............... B01J 21/02 |

OTHER PUBLICATIONS

Final Office Action for copending U.S. Appl. No. 17/053,340, mailed Aug. 16, 2023.
Request for Continued Examination for copending U.S. Appl. No. 17/053,340, filed Nov. 3, 2023.
Amendment & Response th Accompany RCE for copending U.S. Appl. No. 17/053,340, filed Nov. 3, 2023.
English language translation of the International Search Report for corresponding international application PCT/EP2020/076824, filed Sep. 25, 2020.
English language translation of the Written Opinion of the International Searching Authority for corresponding international application PCT/EP2020/076824, filed Sep. 25, 2020.
International Preliminary Report on Patentability for corresponding international application PCT/EP2020/076824, filed Sep. 25, 2020.
European Search Report and Search Opinion for EP 19199659 filed Sep. 25, 2019, corresponding to international application PCT/EP2020/076824; with partial English language machine translation of the Search Opinion.
English language translation of the International Search Report for international application PCT/EP2020/076825, filed Sep. 25, 2020, corresponding to copending U.S. Appl. No. 17/762,732.
English language translation of the Written Opinion of the International Searching Authority for international application PCT/EP2020/076825, filed Sep. 25, 2020, corresponding to copending U.S. Appl. No. 17/762,732.
International Preliminary Report on Patentability for international application PCT/EP2020/076825, filed Sep. 25, 2020, corresponding to copending U.S. Appl. No. 17/762,732.
English language translation of the International Search Report for PCT/EP2020/076854, filed Sep. 25, 2020, corresponding to copending U.S. Appl. No. 17/762,730.
English language translation of the Written Opinion of the International Searching Authority for international application PCT/EP2020/076854, filed Sep. 25, 2020, corresponding to copending U.S. Appl. No. 17/762,730.
English language translation of the International Preliminary Report on Patentability for international application PCT/EP2020/076854, filed Sep. 25, 2020, corresponding to copending U.S. Appl. No. 17/762,730.
European Search Report and Search Opinion for EP 19199651 filed Sep. 25, 2019, corresponding to PCT/EP2020/076854 and PCT/EP2020/076825; with partial English language machine translation of the Search Opinion.
English language translation of the International Search Report for international application PCT/EP2020/076822, filed Sep. 25, 2020, corresponding to copending U.S. Appl. No. 17/762,986.
English language translation of the Written Opinion of the International Searching Authority for international application PCT/EP2020/076822, filed Sep. 25, 2020, corresponding to copending U.S. Appl. No. 17/762,986.
International Preliminary Report on Patentability for international application PCT/EP2020/076822, filed Sep. 25, 2020, corresponding to copending U.S. Appl. No. 17/762,986.
European Search Report and Search Opinion for EP 19199638 filed Sep. 25, 2019, corresponding to PCT/EP2020/076822; with partial English language machine translation of the Search Opinion.
English language translation of the International Search Report for international application PCT/EP2020/076826, filed Sep. 25, 2020, corresponding to copending U.S. Appl. No. 17/053,340.
English language translation of the Written Opinion of the International Searching Authority for international application PCT/EP2020/076826, filed Sep. 25, 2020, corresponding to copending U.S. Appl. No. 17/053,340.
International Preliminary Report on Patentability for international application PCT/EP2020/076826, filed Sep. 25, 2020, corresponding to copending U.S. Appl. No. 17/053,340.
European Search Report and Search Opinion for EP 19199643 filed Sep. 25, 2019, corresponding to PCT/EP2020/076826; with partial English language machine translation of the Search Opinion.
Chang, et al., "A thermally self-sustaining solid oxide fuel cell system at ultra-lo operating temperature (319 C)," Energy 104(20):107-113 (Apr. 2016).
Wen-Wen, et al., "Synthesis and Compression Property of Oxidation-Resistant Ni—Al Foams," Acta. Metall. Sin. 30(1):965-972 (Mar. 2017).
Yashnik, et al., "High-Performance Mn—Al—O Catalyst on Reticulated Foam Materials for Environmentally Friendly Catalytic Combustion," Eurasian Chemico-Technological Journal 17(2):145-158 (Jan. 2015).
Ullman's Encyclopedia of Industrial Chemistry, "Metallic Foams" chapter, published online on Jul. 15, 2012, DOI: 25 10.1002/14356007.c16_c01.pub2.
Restriction Requirement for copending U.S. Appl. No. 17/053,340, mailed Feb. 28, 2022.
Response to Restriction Requirement for copending U.S. Appl. No. 17/053,340, filed Apr. 19, 2022.
U.S. Appl. No. 16/969,607, filed Aug. 13, 2020, US-2021/0032185 A1, Feb. 4, 2021, Roos.
U.S. Appl. No. 17/053,340, filed Nov. 5, 2020, US-2021/0276091 A1, Sep. 9, 2021, Poss.
U.S. Appl. No. 17/059,488, filed Nov. 29, 2020, US-2021/0275996 A1, Sep. 9, 2021, Roos.
U.S. Appl. No. 17/762,730, filed Mar. 23, 2022, Poss.
U.S. Appl. No. 17/762,732, filed Mar. 23, 2022, Poss.
U.S. Appl. No. 17/762,986, filed Mar. 23, 2022, Poss.
Non-Final Office Action for copending U.S. Appl. No. 17/053,340, mailed May 19, 2023.
International Search Report for international application PCT/EP2022/056426, filed Mar. 14, 2022, corresponding to copending U.S. Appl. No. 18/283,156.

(56) References Cited

OTHER PUBLICATIONS

Revised version of the International Search Report for international application PCT/EP2022/056426, filed Mar. 14, 2022, corresponding to copending U.S. Appl. No. 18/283,156.
Written Opinion of the International Searching Authority for international application PCT/EP2022/056426, filed Mar. 14, 2022, corresponding to copending U.S. Appl. No. 18/283,156.
Revised version of the Written Opinion of the International Searching Authority for international application PCT/EP2022/056426, filed Mar. 14, 2022, corresponding to copending U.S. Appl. No. 18/283,156.
International Preliminary Report on Patentability for international application PCT/EP2022/056426, filed Mar. 14, 2022, corresponding to copending U.S. Appl. No. 18/283,156.
European Search Report and Search Opinion for EP 21164243 filed Mar. 23, 2021, corresponding to PCT/EP2022/056426; with partial English language machine translation of the Search Opinion.
Rausch, et al., "Morphology and Utilization of Smooth Hydrogen-Evolving Raney Nickel Cathode Coatings and Porous Sintered-Nickel Cathodes," *J. Electrochem. Soc.* 143(9):2852-2862 (Sep. 1996).
U.S. Appl. No. 18/283,156, filed Sep. 20, 2023, Roos.
Amendment & Response to Office Action for copending U.S. Appl. No. 17/053,340, filed Oct. 12, 2022.
Final Office Action for copending U.S. Appl. No. 17/053,340, mailed Jan. 5, 2023.
Request for Continued Examination for copending U.S. Appl. No. 17/053,340, filed Apr. 3, 2023.
Amendment & Response to Accompany RCE for copending U.S. Appl. No. 17/053,340, filed Apr. 3, 2023.

\* cited by examiner

METAL-FOAM BODY AND METHOD FOR THE PRODUCTION THEREOF AND THE USE THEREOF AS A CATALYST

CROSS REFERENCE TO RELATED APPLICATIONS

The present application is US national stage of international application PCT/EP2020/076824, which had an international filing date of Sep. 25, 2020 and which was published on Apr. 1, 2021. The PCT application claims priority to EP 19199659.4, filed on Sep. 25, 2019. The content of these prior filings is hereby incorporated by reference in its entirety.

BACKGROUND AND PRIOR ART

The present invention relates to processes for producing metal foam bodies, the metal foam bodies which can be produced by these processes, and to the use of these metal foam bodies as catalysts for chemical transformations.

So-called Raney metal catalysts or activated porous metal catalysts are highly active, usually pulverulent, catalysts that have found widespread commercial use. The precursors for Raney metal catalysts are usually alloys/intermetallic phases comprising at least one catalytically active metal and at least one alloy component soluble (leachable) in alkalis. Examples of typical catalytically active metals are Ni, Co, Cu, with additions of Fe, Cr, Pt, Ag, Au, Mo and Pd, examples of typical leachable alloy components are Al, Zn and Si. The production of the Raney metal from the alloys generally takes place through an activation process in which the leachable component is removed through the use of concentrated sodium hydroxide solution.

A key disadvantage of pulverulent Raney metal catalysts is the need to remove them from the reaction medium of the catalysed reaction through costly sedimentation and/or filtration processes.

There has accordingly already been a number of attempts to immobilize Raney metal catalysts and to provide them as fixed-bed catalysts. Thus, EP 2 764 916 describes a process for producing shaped catalyst bodies in foam form that are suitable for hydrogenations, in which: a) a shaped metal foam body is provided that comprises at least one first metal selected for example from Ni, Fe, Co, Cu, Cr, Pt, Ag, Au and Pd, b) at least one second leachable component, or component that can be converted into an leachable component by alloying is applied to the surface of the shaped metal foam body, said component being selected for example from Al, Zn and Si, c) an alloy is formed through alloying of the shaped metal foam body obtained in step b) on at least part of the surface and d) the foam-like alloy obtained in step c) undergoes treatment with an agent capable of leaching the leachable components of the alloy.

WO 2019057533A1 discloses a similar process for producing foam-like shaped catalyst bodies. Here too, metal powders are applied to monolithic foam-like metal bodies and then thermally treated, with the result that alloys are formed in the region of contact of the foam-like metal bodies and metal powders. WO2019057533A1 discloses a multitude of metals and metal combinations that may be chosen for the metal body in foam form and the metal powder, and also general details for the performance of the thermal treatment for alloy formation and some specific examples for treatment of aluminum powder on nickel foam.

The present invention relates to processes for producing metal foam bodies, which comprise the providing of a metal foam body, the subsequent applying of aluminum-containing material, and a thermal treatment for alloy formation. The extent of alloy formation depends on the conditions of the thermal treatment: A long thermal treatment at high temperatures leads, for example, to alloy formation in deeper regions of the metal foam, whereas a shorter thermal treatment at lower temperatures leads only to alloy formation in the upper regions of the metal foam, leaving unalloyed regions within the metal foam. Since unalloyed regions remaining within the metal foam have a positive effect on the mechanical stability of the metal foam, there is a need in the prior art processes to make such metal foams available. A temperature regime according to the invention for the thermal treatment enables limiting of alloy formation to the upper layers of the metal foam, such that unalloyed regions remain in central regions of the metal foam. The processes according to the invention also take account of the thickness of the metal foam bodies treated.

The Present Invention

Processes according to the invention for producing metal foam bodies comprise the following steps:
providing a metal foam body A made of nickel, cobalt, copper or alloys or combinations thereof,
applying an aluminum-containing material MP to metal foam bodies A so as to obtain metal foam bodies AX,
treating metal foam bodies AX thermally, with exclusion of oxygen, in order to achieve alloy formation between the metallic components of metal foam body A and the aluminum-containing material MP so as to obtain metal foam body B,
wherein the duration H of the thermal treatment (in minutes), depending on the temperature T of the thermal treatment (in ° C.), is chosen as follows:
Hmin<H<Hmax, with
maximum duration $H_{max}=d1+(a1-d1)/(1+(T/c1)^{b1})$, and
minimum duration $H_{min}=d2+(a2-d2)/(1+(T/c2)^{b2})$,
where
a1=366.1;
b1=129.0;
c1=650.9;
d1=8.7;
a2=33.5;
b2=235.5;
c2=665.8;
d2=1.8;
and wherein the temperature T of the thermal treatment, depending on the thickness D of the metal foam body AX, is chosen as follows:
when 0 mm<D≤10 mm, 600° C.<T≤680° C.,
when 10 mm<D≤20 mm, 600° C.<T≤675° C.,
when 20 mm<D≤30 mm, 600° C.<T≤665° C.,
when 30 mm<D, 600° C.<T≤660° C.

Experimental results obtained in association with the present invention show that the choice of conditions for the thermal treatment for alloy formation has a considerable influence on the result. The processes according to the invention allow alloy formation to be limited to the upper layers of the metal foam, so that unalloyed regions remain in central regions of the metal foam. The presence of these unalloyed regions affects properties including the chemical and mechanical stability of the resultant metal foam.

In connection with the present invention, a metal foam body A is understood to mean a metal body in foam form. Metal bodies in foam form are described e.g. in Ullmann's Encyclopedia of Industrial Chemistry, section "Metallic Foams", published online on Jul. 15, 2012, DOI: 10.1002/14356007.c16_c01.pub2. Suitable metal foams are in principle those having different morphological properties with regard to pore size and shape, layer thickness, area density, geometric surface area, porosity, etc. The metal foam preferably has an apparent density within a range from 100 to 1500 kg/m$^3$, more preferably from 200 to 1200 kg/m$^3$ and most preferably from 300 to 600 kg/m$^3$. The average pore size is preferably from 400 to 3000 µm, more preferably from 400 to 800 µm. Preferred metal foams have a specific BET surface area of 100 to 20 000 m$^2$/m$^3$, preferably of 1000 to 6000 m$^2$/m$^3$. The porosity is preferably within a range from 0.50 to 0.95. The apparent density of the metal foam is determined in accordance with ISO 845. The average pore size is determined by the Visiocell® analysis method from Recticel described in The Guide 2000 of Technical Foams, book 4, section 4, pages 33-41. In particular, the pore size is measured through optical measurement of the pore diameter by overlaying calibrated rings printed on transparent paper on the selected cell. To obtain an average cell diameter, this pore size measurement is performed on at least 100 different cells. The specific BET surface area is measured in accordance with DIN 9277 by gas adsorption on a metal foam sample of not more than 2 g. Porosity is determined by means of the following equation:

$$\text{Porosity (\%)} = \frac{V_T - W \cdot \frac{1000}{\rho}}{V_T} \cdot 100$$

$V_T$=volume of the metal foam sample in mm$^3$
W=weight of the metal foam sample in g
$\rho$=density of the metal in g/cm$^3$ (e.g. 8.9 g/cm$^3$ for Ni)

Production can be carried out in a manner known per se. For example, a foam made of an organic polymer may be coated successively or simultaneously with two metal components and then the polymer removed by thermolysis, yielding a metal foam. For coating with at least one first metal or a precursor thereof, the foam made of the organic polymer may be contacted with a solution or suspension containing the first metal. This may be done for example by spraying or dipping. Deposition by means of chemical vapor deposition (CVD) is also possible. For example, a polyurethane foam may be coated successively with one or two metals and then the polyurethane foam may be thermolysed. A polymer foam suitable for producing shaped bodies in the form of a foam preferably has a pore size within a range from 100 to 5000 µm, more preferably from 450 to 4000 µm and in particular from 450 to 3000 µm. A suitable polymer foam preferably has a layer thickness from 5 to 60 mm, more preferably from 10 to 30 mm. A suitable polymer foam preferably has a foam density of 300 to 1200 kg/m$^3$. The specific surface area is preferably within a range from 100 to 20 000 m$^2$/m$^3$, more preferably 1000 to 6000 m$^2$/m$^3$. The porosity is preferably within a range from 0.50 to 0.95.

The metal foam bodies A used in step (a) of the process according to the invention may have any desired shape, for example cubic, cuboidal, cylindrical etc., but also more complex geometries.

The aluminum-containing material MP applied to the metal foam body in step (b) contains metallic Al in an amount of 80% to 100% by weight, preferably of 80% to 99.8% by weight and more preferably of 90% to 99.5% by weight, based on the aluminum-containing material MP. High-purity aluminum is highly flammable and should be handled under an inert gas atmosphere. In addition to metallic aluminum (Al), the material may also contain aluminum Al(III). This Al(III) fraction is typically in the form of oxidic compounds selected from the group of aluminum oxides, hydroxides and/or carbonates. More preferably, the Al(III) fraction is within a range from 0.05% to <10% by weight, most preferably within a range from 0.1% to 8% by weight, based on the aluminum-containing material MP. In addition to Al and Al(III), the mixture may also contain organic compounds and/or a further metal or metal oxide or metal carbonate, the further metals preferably being selected from the group of promoter elements such as Ti, Ta, Zr, V, Cr, Mo, W, Mn, Rh, Fe, Ru, Co, Rh, Ir, Ni, Pd, Pt, Cu, Ag, Au, Ce and Bi. The organic compounds are preferably selected from the group comprising hydrocarbons, polymers, resins, waxes, amines and alcohols.

The aluminum-containing material MP applied to the metal foam body in step (b) is preferably an aluminum-containing powder. In preferred embodiments, the aluminum-containing powder contains 1% to 5% by weight, preferably 2% to 4% by weight and most preferably approx. 3% by weight, of organic compounds, in particular a wax, and 94.5% to 98.8% by weight, more preferably 95.5% to 97.8% by weight and most preferably 96.5% to 96.8% by weight, of Al. The particles of the aluminum-containing powder preferably have a diameter of not less than 5 µm and not more than 200 µm. Particular preference is given to powders in which 95% of the particles have a diameter of 5 to 75 µm.

The aluminum-containing powder is usually fixed to the surface of the metal foam body by means of an organic binder. In one embodiment, the metal foam body is impregnated with the organic binder before the actual application of the aluminum-containing powder. The impregnation may be effected for example by spray application of the binder, dipping the metal foam body in the binder, or by pumping or drawing the binder through the foam, but is not limited to these options. The binder is usually used in an amount such that the layer thickness on the metal foam body is 10 to 60 µm, preferably 10 to 30 µm. The aluminum-containing powder may then be applied to the metal foam body thus prepared.

Alternatively, the organic binder and the aluminum-containing powder may be applied in a single step. For this purpose, before being applied, the aluminum-containing powder is either itself suspended in a liquid binder or the aluminum-containing powder and the binder are suspended/dissolved in an auxiliary liquid.

The application of the aluminum-containing powder in step (b) of the process according to the invention may be effected in various ways, for example by contacting the metal foam body with the aluminum-containing powder by rolling or dipping, or by applying the aluminum-containing powder by spraying, sprinkling or pouring. For this, the aluminum-containing powder may be in the form of a pure powder or else suspended in the binder and/or an auxiliary liquid. If an auxiliary liquid is used, this is preferably water.

The binder is an organic compound that promotes adhesion of the aluminum-containing powder to the metal body. Preference is given to the binder selected from polyvinylpyrrolidone (PVP), ethylene glycol, waxes, polyethyleneimine (PEI) and mixtures of said compounds. Particular preference as binder is given to PVP or PEI, for example where $M_w$=10 000 to 1 300 000 g/mol, determined by gel-permeation chromatography using a polystyrene standard. Preference is given to using as binder PEI, e.g. where $M_w$=500 000 to 1 000 000 g/mol or $M_w$=600 000 to 900 000 g/mol. PEI is typically used in aqueous solution, preferably in concentrations of 0.5% to 15% by weight, more preferably 1% to 10% by weight or 2% to 5% by weight and most preferably 2% to 3% by weight, based on the weight of PEI and water. The aluminum-containing powder may be suspended in the binder, optionally dissolved in an auxiliary liquid such as water, e.g. in the aqueous PEI solution, the amount of the aluminum-containing powder in the suspension being preferably 30% to 70% by weight, more preferably 40% to 60% by weight, most preferably 45% to 55% by weight, based on the total weight of the suspension.

Examples of alternative methods of applying the aluminum-containing material MP in step (b) include dipping the metal foam body in a metal melt, sputtering deposition or chemical vapor-phase deposition of the aluminum-containing material MP, and deposition of the aluminum-containing material MP as metal salts with subsequent reduction to the metal. Combinations of all said methods of application are also possible.

In a preferred embodiment of the present invention, the aluminum-containing material MP is an aluminum-containing powder, and an organic binder is applied to metal foam body A together with, or before, the aluminum-containing powder.

The coated metal foam bodies are soft and can therefore be easily deformed if required. For example, the coated metal foam bodies may be embossed on the surface, for example with a corrugated profile. The embossing can be performed with a standard tool, for example a profiled roller, a stamp or another embossing tool. In addition, the coated metal foam bodies may, optionally after prior embossing, be folded or rolled up. A modified metal foam body may also be obtained by stacking two or more metal foam bodies one on top of another, optionally after prior embossing, where the body may consist solely of coated metal foam bodies or may include an uncoated metal foam body interposed between two coated metal foam bodies. Rolled-up, folded or stacked metal foam bodies are also referred to herein as multilayer and may optionally undergo further shaping by various shaping methods. The shaping, reshaping and/or stacking of the coated metal foam bodies can produce a shaped metal foam body AX having a desired geometry, according to the planned field of use.

In step (c) of the process according to the invention, a thermal treatment is effected in order to achieve the formation of one or more alloys. Experimental results obtained in connection with the present invention show that relatively strict temperature control is necessary in order to restrict alloy formation to the upper regions of the metal foam and to leave unalloyed regions within the metal foam. Moreover, in the selection of the conditions for thermal treatment, it is necessary to take note of the thickness D of the metal foam body AX. The thermal treatment of metal foam bodies AX in step (c) of the process according to the invention must be conducted with exclusion of oxygen.

The duration H of the thermal treatment (in minutes), depending on the temperature T of the thermal treatment (in °C.), is chosen as follows:
  Hmin<H<Hmax, with
    maximum duration $H_{max}=d1+(a1-d1)/(1+(T/c1)^{b1})$, and
    minimum duration $H_{min}=d2+(a2-d2)/(1+(T/c2)^{b2})$,
  where
    a1=366.1;
    b1=129.0;
    c1=650.9;
    d1=8.7;
    a2=33.5;
    b2=235.5;
    c2=665.8;
    d2=1.8;
  and wherein the temperature T of the thermal treatment, depending on the thickness D of the metal foam body AX, is chosen as follows:
    when 0 mm<D≤10 mm, 600° C.<T≤680° C.,
    when 10 mm<D≤20 mm, 600° C.<T≤675° C.,
    when 20 mm<D≤30 mm, 600° C.<T≤665° C.,
    when 30 mm<D, 600° C.<T≤660° C.

The thickness D of the metal foam body AX is determined here as follows:

In the case of metal foam bodies having simple geometries, for example in the case of cuboidal cutouts from metal foam mats, D denotes the length of the shortest edge of those cutouts, i.e. in many cases simply the thickness of the metal foam mat. In the case of objects having more complicated geometry, D is ascertained by a rough estimate, assuming an excessively high value D if anything, in the case of doubt, rather than one that is too low. The value D is estimated here as twice the value of the shortest distance from the surface of the point within the body that has the maximum shortest distance from the surface. In each case, in the determination of D, the foam pores and their surfaces should be neglected, meaning that the foam pores should be considered to be filled for this determination. Moreover, recesses in the bodies in question with diameters below 1 cm should not be considered to be surface, but rather likewise to be filled regions.

The thermal treatment comprises the heating, typically in a stepwise manner, of the metal foam body AX and subsequent cooling to room temperature. The thermal treatment takes place under inert gas or under reductive conditions. Reductive conditions are understood to mean the presence of a gas mixture containing hydrogen and at least one gas which is inert under the reaction conditions; a suitable example is a gas mixture containing 50% by volume of $N_2$ and 50% by volume of $H_2$. The inert gas used is preferably nitrogen. The heating can be accomplished for example in a belt furnace. Suitable heating rates are within a range from 10 to 200 K/min, preferably 20 to 180 K/min. During the thermal treatment, the temperature is typically first increased from room temperature to about 300 to a maximum of 350° C. and this temperature is maintained for a period of about 2 to 30 minutes in order to remove moisture and organic constituents from the coating. No alloy formation takes place in this phase of the thermal treatment.

Subsequently, the temperature is increased into the region above 600° C., and alloy is formed between the metallic components of metal foam bodies A and the aluminum-containing material MP, so as to obtain metal foam body B.

In order to limit alloy formation to the upper regions of the metal foam, and to leave unalloyed regions within the metal foam, it is necessary to suitably choose the duration H of the thermal treatment depending on the temperature T of the thermal treatment. According to the invention, the duration H of the thermal treatment (in minutes), depending on the temperature T of the thermal treatment (in °C.), is chosen as follows:
  Hmin<H<Hmax, with
    maximum duration $H_{max}=d1+(a1-d1)/(1+(T/c1)^{b1})$, and
    minimum duration $H_{min}=d2+(a2-d2)/(1+(T/c2)^{b2})$,
  where
    a1=366.1;
    b1=129.0;

c1=650.9;
d1=8.7;
a2=33.5;
b2=235.5;
c2=665.8;
d2=1.8;
and wherein the temperature T of the thermal treatment, depending on the thickness D of the metal foam body AX, is chosen as follows:
when 0 mm<D≤10 mm, 600° C.<T≤680° C.,
when 10 mm<D≤20 mm, 600° C.<T≤675° C.,
when 20 mm<D≤30 mm, 600° C.<T≤665° C.,
when 30 mm<D, 600° C.<T≤660° C.

After the alloy formation, the metal foam body is cooled down with exclusion of oxygen. The cooling can be effected simply by stopping the thermal treatment, for instance by removing the metal foam body from the heated environment, e.g. the furnace, with exclusion of oxygen and allowing it to cool down gradually to ambient temperature. However, it is preferable for the shaped catalyst body to be brought to a temperature below 200° C. as swiftly as possible in order to "freeze" the intermetallic phases that are potentially subject to leaching. This can be effected by means of a suitable coolant; preferably cooling is achieved in a cooling zone of the furnace, such as the belt furnace. This may be enclosed, e.g. by a cooling water jacket. The cooling rate is preferably 5 to 500 K/min, more preferably 20 to 400 K/min and most preferably 30 to 200 K/min.

During thermal treatment and cooling, the shaped body must be kept in an oxygen-free environment. "With exclusion of oxygen" or "in an oxygen-free environment" herein means in an inert gas atmosphere or under a reducing atmosphere. The inert gas used is preferably nitrogen. Suitable reducing atmospheres are for example mixtures of inert gas with hydrogen, such as $N_2/H_2$ mixtures, preferably in a volume ratio of 50/50. The shaped body is preferably heated and cooled in a stream of nitrogen, typically at a flow rate within a range from 5 to 30 $m^3/h$, more preferably 10 to 30 $m^3/h$.

The effect of an excessively high temperature T and/or an excessive duration H is that alloy formation progresses into the lowest layers of the metal foam and no unalloyed regions remain. The effect of too low a temperature T and/or too short a duration H is that alloy formation does not commence at all.

If, during alloy formation, time intervals with different temperatures T are chosen within the range according to the invention, $H_{min}$ and $H_{max}$ for the temperature T of the thermal treatment can be determined using an average weighted according to the duration of these time intervals.

If there are two metallic components in metal foam body A, in a preferred embodiment, the mass ratio of the two metallic components in metal foam body A is in the range from 1:1 to 20:1, more preferably in the range from 1:1 to 10:1.

In a preferred embodiment, metal foam body A consists of metallic nickel.

In a further preferred embodiment, the ratio V of the masses of metal foam body B to metal foam body A, V=m(metal foam body B)/m(metal foam body A), is in the range from 1.1:1 to 1.5:1, more preferably in the range from 1.2:1 to 1.4:1.

In a further aspect, the present invention further comprises processes having the following step (d): activating the metal foam body B by treatment with a leaching agent. The treatment of the metal foam body B with a leaching agent serves to at least partly dissolve metal components of the composition of the aluminum-containing material MP applied and alloys between metallic components of metal foam body and the composition of the aluminum-containing material MP, and in that way to remove them from the metal foam body. The aluminum content in the metal foam body has an influence on catalytic performance and the lifetime, particularly on hydrogenation activity and on chemical stability in the reaction medium. Typically 30% to 70% by weight, preferably 40% to 60% by weight, of the aluminum, based on the original total weight of aluminum in the metal foam body, is leached out. The lower the residual aluminum content, the higher the hydrogenation activity of the metal foam body according to the invention. Residual aluminum contents established are preferably from 2% to 20% by weight, more preferably from 5% to 15% by weight, even more preferably from 2% to 17% by weight, and most preferably from 3% to 12% by weight, based on the total mass of the metal foam body.

A suitable leaching agent is any agent that selectively leaches aluminum from the intermetallic phases; this may be alkaline or acidic or complex-forming. The leaching agent is preferably an aqueous solution of a base such as a hydroxide, preferably an alkali metal hydroxide, more preferably NaOH, KOH and/or LiOH or mixtures thereof, most preferably NaOH.

In a preferred embodiment, the treatment of the metal foam body B with a basic solution is performed for a period in the range from 5 minutes to 8 hours at a temperature in the range from 20 to 120° C., preferably at 60 to 115° C., and more preferably 80 to 110° C., where the basic solution is an aqueous NaOH solution having an NaOH concentration between 2% and 30% by weight. The leaching time, i.e. the duration of treatment in step (0 with the leaching agent, for instance aqueous NaOH solution, is preferably 15 to 90 min.

The activation in step (d) of the process according to the invention may be performed, for example, in liquid-phase mode or trickle mode. After treatment with the leaching agent, the shaped catalyst body is preferably washed with a washing medium selected from water, $C_1$-$C_4$ alkanols and mixtures thereof. Suitable $C_1$-$C_4$ alkanols are methanol, ethanol, n-propanol, isopropanol, n-butanol and isobutanol.

Given suitable choice of the metallic components, it is possible to use metal foam bodies that are obtained as a result of the treatment with basic solution as catalysts, as disclosed, for example, in WO2019057533A1.

The activated metal foam body may in some embodiments be modified in step (e) by post-doping with further metals; these doping elements, also referred to as promoter elements, are preferably selected from the transition metals. For post-doping, the metal foam body is treated with a preferably aqueous solution of the doping element(s) to be applied. In order not to damage the metal foam body, the doping solution typically has a pH≥7. It is possible to add a chemically reducing component to the solution of the doping element(s) to be applied in order to bring about reductive deposition of the dissolved doping element(s) on the metal foam body. Preferred doping elements for the modification are selected from the group consisting of Mo, Pt, Pd, Rh, Ru, Cu and mixtures thereof. Suitable doping methods are described for example in WO 2019/057533, on pages 20 to 25.

The metal foam body activated in step (d) and optionally post-doped in step (e) may either be used immediately as catalyst or stored. In order to prevent surface oxidation processes and an associated reduction in catalytic activity, the metal foam body is preferably stored under water after activation.

In a further aspect, the present invention further encompasses coated metal foam bodies obtainable by one of the processes according to the invention.

Activated and optionally doped metal foam bodies obtainable by one of the processes according to the invention can be used as catalysts for numerous catalysed chemical reactions of organic compounds in particular, for example hydrogenation, isomerization, hydration, hydrogenolysis, reductive amination, reductive alkylation, dehydrogenation, oxidation, dehydration and rearrangement, preferably for hydrogenation reactions. The shaped catalyst bodies according to the invention are in principle highly suitable for all hydrogenation reactions catalysed by Raney metal catalysts. Preferred uses of the catalytically active metal foam bodies according to the invention are selective methods of hydrogenation of carbonyl compounds, olefins, aromatic rings, nitriles and nitro compounds. Specific examples are the hydrogenation of carbonyl groups, hydrogenation of nitro groups to amines, hydrogenation of polyols, hydrogenation of nitriles to amines, for example the hydrogenation of fatty nitriles to fatty amines, dehydrogenation of alcohols, reductive alkylation, hydrogenation of olefins to alkanes and the hydrogenation of azides to amines. Particular preference is given to use in the hydrogenation of carbonyl compounds.

In a further aspect, the present invention therefore encompasses the use of activated and optionally doped metal foam bodies obtainable by one of the processes according to the invention as catalysts for chemical transformations, preferably for chemical transformations selected from hydrogenation, isomerization, hydration, hydrogenolysis, reductive amination, reductive alkylation, dehydrogenation, oxidation, dehydration and rearrangement.

EXAMPLES

1. Providing of Metal Foam Bodies

Three metal foam mats (a, b, c) made of nickel were provided (manufacturer: AATM, thickness: 1.9 mm, basis weight: 1000 g/m$^2$, average pore diameter: 580 μm).

2. Applying of Aluminum Powder

Subsequently, binder solution (polyethyleneimine (2.5% by weight) in water) was first sprayed onto all metal foam mats, followed by application of pulverulent aluminum (manufacturer: Mepura, average particle size: <63 μm, containing 3% by weight of added ethylenebis(stearamide)) in the form of a dry powder (about 400 g/m$^2$).

After the foam mats have been coated, 6 cuboidal foam bodies of different thickness (a1, a2, a3, b1, b2, b3) were produced by stacking individual layers of thickness 1.9 mm (length and width each 25 mm) one on top of another. In order to increase the number of contact points and the contact area, the foam bodies were then compressed by about 30%.

Metal foam bodies a1, a2 and a3: thickness 9 mm (7 layers each of thickness 1.9 mm=thickness 13.3 mm; compression to 9 mm)

Metal foam bodies b1, b2 and b3: thickness 12 mm (9 layers each of thickness 1.9 mm=thickness 17.1 mm; compression to 12 mm)

3. Thermal Treatment

Thereafter, all metal foam bodies were subjected to a thermal treatment under nitrogen atmosphere in a furnace. This involves first removing the binder thermally at 350° C. for 30 min and then heating up to the maximum temperature within 10 min; this was maintained for a defined period of time (duration of treatment), followed by quenching to below 200° C.

| Metal foam body | Treatment temperature (° C.) | Duration of treatment (min) |
|---|---|---|
| a1 (thickness: | 679 | 3 |
| a2 (thickness: 9 mm | 660 | 15 |
| a3 (thickness: 9 mm | 679 | 15 |
| b1 (thickness: 12 mm | 674 | 9 |
| b2 (thickness: 12 mm | 660 | 15 |
| b3 (thickness: 12 mm | 679 | 9 |

4. Determination of Extent of Alloying

At the end, the extent of alloy formation in the metal foam bodies was determined. This was done by examining cross sections of the metal foam bodies under a microscope and scanning electron microscope.

This gave the following result:

While superficial alloy formation had taken place in metal foam bodies a1 and b1, but unalloyed regions remained within the metal foam, no alloy formation took place in the case of metal foam bodies a2 and b2, and alloy formation in metal foam bodies a3 and b3 is so far advanced that no unalloyed regions remained within the metal foam.

Among the findings from prior experiments, moreover, is that: If the temperature for alloy formation is chosen above 680° C., for example 700° C., the aluminum reacts with the nickel in an uncontrolled manner and the shaped body burns off, leaving just powder residues.

This result clearly shows that departure from the thermal treatment conditions according to the invention has the effect that superficial alloy formation leaving unalloyed regions within the metal foam is difficult to achieve.

5. Determination of the Position of the Limiting Curves of the Heating Time

On the basis of the abovementioned results, the position of the limiting curves for the heating time that, for a given heating temperature, leads to superficial alloy formation leaving unalloyed regions within the metal foam was ascertained by a sigmoidal model (heating time=d+(a−d)/(1+(heating temperature/c)^b)).

The limiting values used for the position of the upper curve (maximum heating time) were the following values:

| Temp (° C.) | → | Duration (min) |
|---|---|---|
| 680 | → | 10 |
| 675 | → | 12 |
| 665 | → | 30 |
| 660 | → | 60 |

The limiting values used for the position of the lower curve (minimum heating time) were the following values:

| Temp (° C.) | → | Duration (min) |
|---|---|---|
| 680 | → | 2 |
| 675 | → | 3 |
| 665 | → | 20 |
| 660 | → | 30 |

The following result was found for the position of the limiting curves (reporting of H in minutes and reporting of T in ° C.):

maximum duration $H_{max}=d1+(a1-d1)/(1+(T/c1)^{b1})$, with
a1=366.1;
b1=129.0;
c1=650.9;
d1=8.7;
and minimum duration $H_{min}=d2+(a2-d2)/(1+(T/c2)^{b2})$, with
a2=33.5;
b2=235.5;
c2=665.8;
d2=1.8.

6. Determination of the Interval Limits for the Temperature of the Thermal Treatment Depending on the Thickness of the Metal Foam Bodies Treated The position of the interval limits for the temperature of the thermal treatment depending on the thickness of the metal foam bodies treated was found from the results presented above and further experience values.

The temperature T for the thermal treatment (in ° C.), depending on the thickness D of the metal foam body AX (in millimeters), should be selected as follows:
when 0 mm<D≤10 mm, 600° C.<T≤680° C.,
when 10 mm<D≤20 mm, 600° C.<T≤675° C.,
when 20 mm<D≤30 mm, 600° C.<T≤665° C.,
when 30 mm<D, 600° C.<T≤660° C.

The invention claimed is:

1. A process for producing a metal foam body, comprising the following steps:
(a) providing a metal foam body A made of nickel, cobalt, copper, alloys thereof or combinations thereof;
(b) applying an aluminum-containing material MP to metal foam body A so as to obtain metal foam body AX;
(c) treating metal foam body AX thermally, with exclusion of oxygen, in order to form an alloy between the metallic components of metal foam body A and the aluminum-containing material MP so as to obtain metal foam body B;
wherein the duration H of the thermal treatment (in minutes), depending on the temperature T of the thermal treatment (in ° C.), is chosen as follows: $H_{min}<H<H_{max}$, wherein:
maximum duration $H_{max}=d1+(a1-d1)/(1+(T/c1)^{b1})$; and
minimum duration $H_{min}=d2+(a2-d2)/(1+(T/c2)^{b2})$; wherein:
a1=366.1; b1=129.0; c1=650.9; d1=8.7;
a2=33.5; b2=235.5; c2=665.8; d2=1.8;
and wherein the metal foam body AX has a thickness D of 10-30 mm and the temperature T of the thermal treatment, depending on the thickness D of the metal foam body AX, is chosen as follows:
when D=10 mm, 600° C.<T≤680° C.;
when 10 mm<D≤20 mm, 600° C.<T≤675° C.;
when 20 mm<D≤30 mm, 600° C.<T≤665° C.

2. The process of claim 1, wherein the aluminum-containing material MP is an aluminum-containing powder, and an organic binder is applied to metal foam body A together with, or before, the aluminum-containing powder.

3. The process of claim 1 wherein metal foam body A consists of nickel.

4. The process of claim 1, wherein metal foam body A has an apparent density in the range of from 100 to 1500 kg/m³.

5. The process of claim 1, wherein metal foam body A has a specific BET surface area of 100 to 20 000 m²/m³.

6. The process of claim 1, wherein metal foam body A has a porosity of 0.50 to 0.95.

7. The process of claim 1, wherein the aluminum-containing material MP in step (b) contains metallic aluminum in an amount of 80% to 100% by weight.

8. The process of claim 1, wherein the aluminum-containing material MP is a powder composed of particles, 95% of which have a diameter in the range from 5 to 75 μm.

9. The process of claim 1, further comprising the following step:
(d) activating the metal foam body B by treatment with a leaching agent.

10. The process of claim 9, wherein the treatment of the metal foam body B with leaching agent is performed for a period of 5 minutes to 8 hours at a temperature of 20 to 120° C., and wherein the leaching agent is an aqueous NaOH solution having an NaOH concentration of 2% to 30% by weight.

11. The process of claim 9, further comprising the following step:
(e) post-doping the activated metal foam body B with a promoter element selected from the group consisting of: Mo, Pt, Pd, Rh, Ru, Cu and mixtures thereof.

12. The process of claim 1, wherein metal foam body A has an apparent density of 300 to 600 kg/m³.

13. The process of claim 12, wherein metal foam body A has a specific BET surface area of 1000 to 6000 m²/m³.

14. The process of claim 13, wherein metal foam body A has a porosity of 0.50 to 0.95.

15. The process of claim 14, wherein the aluminum-containing material MP in step (b) contains metallic aluminum in an amount of 90% to 99.5% by weight.

16. The process of claim 15, wherein the aluminum-containing material MP is a powder composed of particles, 95% of which have a diameter in the range from 5 to 75 μm.

17. The process of claim 16, further comprising the following step:
(d) activating the metal foam body B by treatment with a leaching agent.

18. The process of claim 17, wherein treatment of the metal foam body B with leaching agent is performed for a period of 5 minutes to 8 hours at a temperature of 20 to 120° C., and wherein the leaching agent is an aqueous NaOH solution having an NaOH concentration of 2% to 30% by weight.

19. The process of claim 1, wherein the thermal treatment of step c) takes place in a belt furnace and wherein during thermal treatment, the temperature is first increased from room temperature to about 300 to 350° C. and this temperature is maintained for a period of about 2 to 30 minutes to remove moisture and organic constituents from the coating.

20. The process of claim 19, wherein, after the alloy formation, the metal foam body is cooled to a temperature below 200° C., wherein cooling is achieved in a cooling zone of the furnace.

* * * * *